United States Patent [19]
Mier

[11] 3,796,024
[45] Mar. 12, 1974

[54] FILTER ASSEMBLY
[76] Inventor: Randall Mier, 447 Norway Ave., Trenton, N.J. 08629
[22] Filed: Aug. 23, 1972
[21] Appl. No.: 283,194

[52] U.S. Cl.............. 55/267, 55/378, 55/473, 55/482
[51] Int. Cl............................................. B01d 51/00
[58] Field of Search ............ 55/307, 365, 371, 373, 55/378, 471, 467, 473, DIG. 20, 30, 41, 269, 267; 110/119, 162

[56] References Cited
UNITED STATES PATENTS

| | | | |
|---|---|---|---|
| 3,462,919 | 9/1969 | Zalman | 55/256 |
| 2,514,280 | 7/1950 | Hammell | 55/378 |
| 2,028,215 | 1/1936 | Heuberger | 55/378 |
| 3,716,967 | 2/1973 | Doyle, Jr. et al. | 55/467 |
| 2,514,809 | 7/1950 | Soergel | 55/473 |
| 3,732,075 | 5/1973 | Acaba | 55/443 |

OTHER PUBLICATIONS

January/February 1973, "Filtration & Separation" Vol. 10, No. 1, Uplands Press Ltd., Katharine St., (England), p. 48.

Primary Examiner—Frank W. Lutter
Assistant Examiner—David Lacey
Attorney, Agent, or Firm—Sperry and Zoda

[57] ABSTRACT

A filter assembly for application to a chimney exhaust is provided with a duct positioned at an angle to the axis of the chimney, a filter element is located in the duct at one side of said axis and a blower, communicating with the duct, serves to direct cool ambient air across said axis toward the filter to increase the chimney draft and cool the smoke, while forcing it through the filter. The filter is provided with a metal or other substantially rigid support and is removable from the duct for the cleaning or the disposal thereof.

3 Claims, 4 Drawing Figures

PATENTED MAR 12 1974 3,796,024

3,796,024

FILTER ASSEMBLY

FIELD OF THE INVENTION

The reduction or elimination of smoke particles from the chimneys of industrial and domestic installations is of vital importance to the ecology. However, the equipment provided for this purpose has heretofore been expensive and complicated. Moreover, many such devices have been of a type involving modification of the furnace or other installations or have embodied constructions which impose back pressure on the chimney or smoke stack so as to reduce the draft or interfere with the operation of the furnace producing the smoke.

In accordance with the present invention, simple and inexpensive means are provided which are adapted for application to the chimneys of industrial and domestic furnaces to filter the smoke therefrom so as to eliminate or reduce the soot, fly ash, and polutants discharged into the atmosphere. For this purpose a unit including a duct extending transversely with respect to the axis of the chimney is provided at one side of the axis with a filtering element, whereas; a blower is arranged to cause cool, fresh outside air to flow through the duct and across the axis of the chimney to and through the filter.

The temperature of the smoke and fumes from the chimney are thereby reduced while the chimney draft is not reduced and may even be increased or otherwise controlled. The filter element is preferably removable for cleaning or replacement and may be supported on a strong framework or the like to provide an extended filtering element while employing relatively light, flexible, and inexpensive filtering means.

THE DRAWING

PREFERRED EMBODIMENTS

Figure 1:
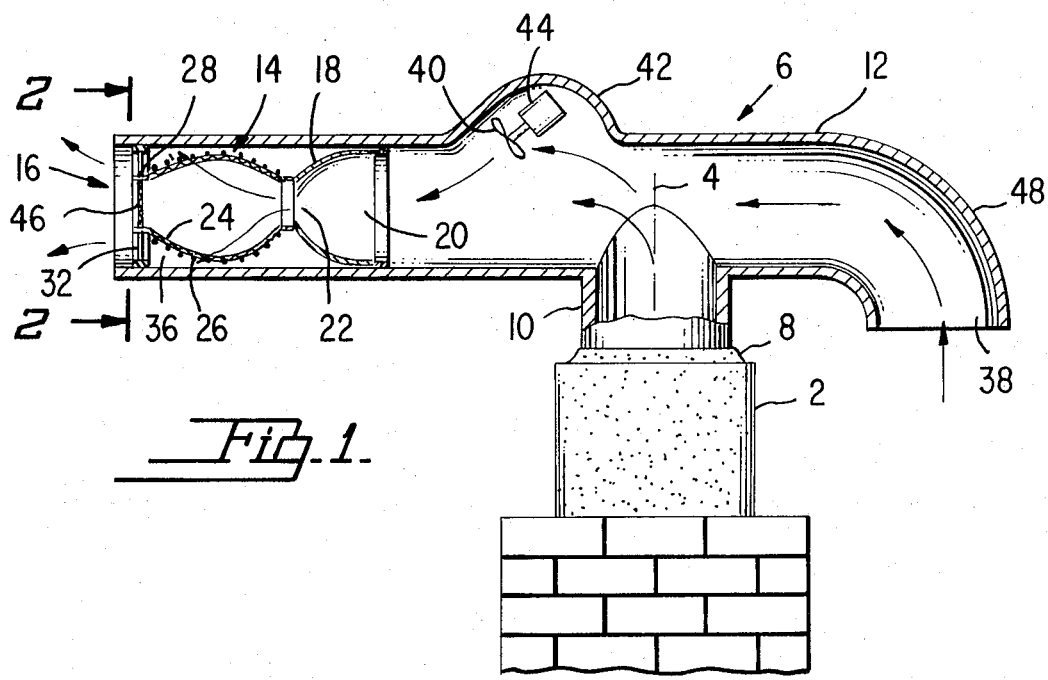
FIG. 1 is a vertical sectional view through one typical embodiment of the present invention.

In those forms of the invention chosen for purposes of illustration in the drawing, a chimney 2 has a vertical axis 4 and a smoke filtering unit indicated generally at 6, is mounted on the upper end of the chimney in any suitable way, as for example, by means of cement 8, or the like.

The unit 6 has a vertically extending flue 10 held in a position, concentric with the axis 4 of the chimney, and communicating at its upper end with a duct 12 which preferably is tubular in shape and extends at an angle to the axis of the chimney, which angle is preferably a right angle to the chimney.

Filtering means, indicated generally at 14, are located in the duct 12 at one side of the axis 4 of the chimney and between the axis and the open free end 16 of the duct 12. The filtering means shown in FIG. 1 includes a metal inlet member 18 which presents a larger end 20 facing toward the flue 10 of the assembly and a somewhat reduced end 22 to which a filter bag 24 is secured. The filter bag may be formed of any suitable porous or perforated material such as fiber glass or the like and preferably that form of woven fiber glass which is capable of retaining up to 98 percent of all particles 4 microns or larger in size. The filter bag is surrounded by a reinforcing member 26 which may be formed of large mesh wire or metal screen secured at its outer end to a retaining ring 28, located near the open discharge end 16 of the duct 12. Ring 28 is spaced from the inner walls of the duct 12 by struts 32 extending inward from a supporting and positioning ring 34 so as to provide a cylindrical gas passage 36 for the flow of filtered gases outward to the air from the discharge end 16 of the duct 12.

In order to assure effective operation of the filtering means without imposing objectionable back pressure on the chimney, which might reduce its draft or interfere with the operation of the furnace to which the chimney is connected, the equipment of the present invention is provided with a blower for moving air through the duct 12 and across the axis 4 of the chimney 2 and flue 10.

For this purpose, the duct 12 is provided with an air inlet opening 38 located on the opposite side of the axis 4 of the chimney from the open free end 16 of the duct. A blower 40 mounted in or on the duct 12 serves to move cool, ambient air into the air inlet opening 38 and across the axis of the chimney so as to mingle with the smoke and soot to cool the same and cause it to flow through the filter member 24 to the cylindrical gas passage 36 and out through the free end 16 of the duct 12. The blower 40 may be largely housed within a housing 42 offset from the duct 12 to avoid overheating or damage to the motor 44 thereof while protecting the motor from rain. At the same time, the air thus flowing across the upper end of the chimney, serves to induce the flow of gases, fumes, and smoke upward from the chimney and through the filtering means. This overcomes the resistance imposed by the filtering means to the flow of gases therethrough, and avoids a reduction in the draft of the chimney. Moreover this construction serves as a safety means in the event the filter should become clogged in that the smoke and gases then can issue through the air inlet opening 38.

In the construction shown in the drawing, the blower 40 is positioned to direct cool, ambient air toward the conical portion 22 of the inlet member 18 of the filtering means. Accordingly, a turbulent condition is established as the air and smoke pass through the reduced end 22 of the member 18 and into the interior of the filter bag 24.

In this way, the mingling of cool air with the hot gases from the chimney eliminates hot spots or high temperature areas which might otherwise fuse or damage the material of which the filter is formed. Moreover, a more uniform distribution of the soot, fly ash, and other solid materials, contained in the smoke, is developed throughout the entire area of the filter. Additionally, the retaining ring 28 at the outer end of the filter bag may be provided with a substantially flat porous filter plug 46 against which sparks or solid particles may impinge so as to reduce possible damage to the filter bag surrounding the space into which the smoke gases and air pass from the chimney and duct 12.

Further, as is shown in the drawing, the inlet end of the duct 12 may be provided with a downwardly turned end 48, wherein the air inlet 38 is located so that the external air currents will not materially influence or oppose the flow of air through the duct 12 under the action of the blower 40. The smoke filtering means then serves to provide substantially uniform and predetermined chimney draft and flow of smoke through the filtering means.

When the filtering means has become charged with soot or other solid material, it can be readily removed through the open discharge end 16 of the duct 12, so as to be cleaned or replaced. A new or cleaned filter bag can then be applied to the reinforcing member 26 and the assembly reinserted into the duct 12, to a predetermined and correct position for effective operation.

Such replacement can be effected quickly, easily and with a minimum of labor and delay. At the same time, the soot is retained in the bag or filter preventing loss or scattering thereof.

Figure 3:
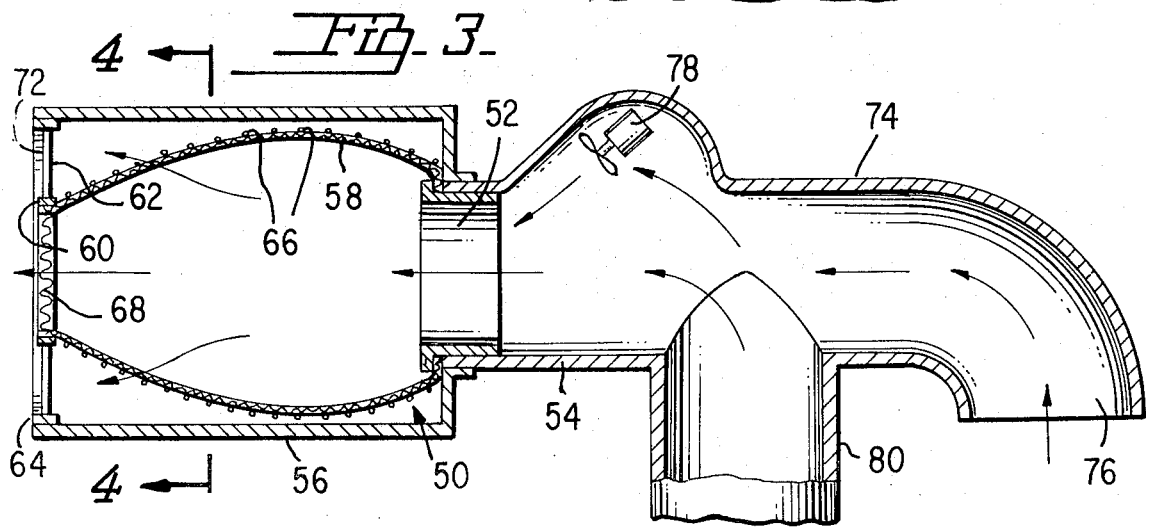
FIG. 3 is a vertical sectional view similar to that of FIG. 1 but illustrating a modification of the present invention.
Figure 2:
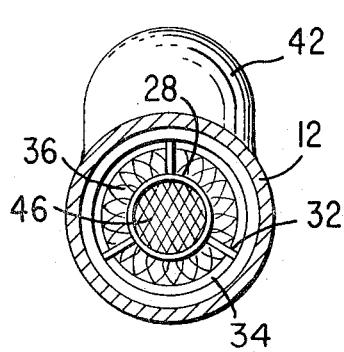
FIG. 2 is a sectional view of the construction illustrated in FIG. 1 taken on line 2—2 thereof.
Figure 4:
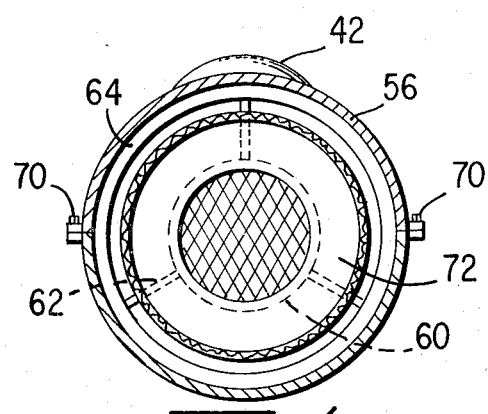
FIG. 4 is an end view of the construction shown in FIG. 3 as seen from the left end thereof.

In that form of the invention shown in FIGS. 3 and 4 the filter assembly 50 includes an inner cylindrical positioning member 52 which may be in the form of a metal tube fitting within duct portion 54 and of substantially the same diameter as the duct portion so that it will impose no restriction to the flow of smoke and gases therethrough from the duct portion 54. An enlarged housing 56 is secured to the outer end of duct portion 54 for enclosing a filter bag 58. The bag 58 is secured at its inner end to the positioning member 52 and is secured at its outer end to a centering ring 60 spaced from the inner surface of the housing by struts 62 carried by a positioning ring 64. Reinforcing means in the form of open mesh wire or screening 66 surrounds the filter bag 58 and is secured at its opposite ends to the positioning member 52 and the centering ring 60. A porous filter plug 68 may be mounted in the centering ring 64 to close the outer end of the filter bag. If desired, the housing 56 may be formed as two semi-cylindrical halves secured together by bolts 70 to permit separation thereof for easy removal of the filter assembly and bag for cleaning or replacement.

The assembly thus provided renders it possible to employ a larger filter bag 58 and presents an enlarged discharge outlet 72 through which the smoke, gases, and ambient air may flow with a minimum of restriction.

The construction, as in that shown in FIG. 1, embodies an ambient air passage 74 having an inlet 76 and a blower 78 arranged to cause the ambient air to flow across the upper end of the flue 80 so as to promote the flow of smoke and fumes through the chimney and assure the desired stack draft in the chimney.

While two particular and preferred embodiments of the invention have been shown in the drawing and described above, it will be apparent that numerous changes may be made in the form, arrangement and positioning of the various elements of the combination. In view thereof it should be understood that the particular form of the invention herein disclosed is intended to be illustrative only, and is not intended to limit the scope of the invention.

I claim:

1. Equipment for reducing the quantity of soot and fly ash, discharged from a chimney, comprising a unit to be applied to the chimney and including:

a duct extending to each side of, and at a right angle to the axis of the chimney, said duct having a straight section extending to one side of chimney and a downwardly curving section extending from the other side of the chimney and open to the atmosphere;

a filter assembly supported within said duct, concentric to the axis of said duct, and located in the straight section of said duct to one side of the axis of the chimney;

a blower arranged to move air through said duct and through said filter element to cool the smoke and fumes issuing from the chimney and cause soot, fly ash, and the like, to be received and retained by said filtering assembly, said blower being located in the straight section of said duct between the axis of the chimney and said filter assembly.

2. Equipment as defined in claim 1, wherein: said filter assembly includes a filter bag and said filtering bag is supported by an open mesh metal work and is removably connected thereto.

3. The equipment of claim 1 wherein: said duct includes a recess in which is placed the motor used to drive said blower, such that said motor will be protected from heat and debris issuing from said chimney.

* * * * *